United States Patent [19]

Civalier

[11] 4,006,473
[45] Feb. 1, 1977

[54] IRRIGATION SIGNAL
[76] Inventor: Gerald T. Civalier, P.O. Box 6822, Phoenix, Ariz. 85009
[22] Filed: Sept. 2, 1975
[21] Appl. No.: 609,308
[52] U.S. Cl. .................. 340/244 C; 340/235; 324/65 P
[51] Int. Cl.² ........................ G08B 21/00
[58] Field of Search .......... 340/244, 245, 234, 235; 324/65 P, 65 R; 73/304 R; 307/118; 200/61.05

[56] References Cited
UNITED STATES PATENTS

| | | | |
|---|---|---|---|
| 2,437,134 | 3/1948 | Smith | 324/65 P |
| 2,461,111 | 2/1949 | Flinspach et al. | 324/65 P |
| 3,239,829 | 3/1966 | Cline et al. | 340/244 A |

Primary Examiner—John W. Caldwell
Assistant Examiner—Daniel Myer
Attorney, Agent, or Firm—Drummond, Nelson & Ptak

[57] ABSTRACT

A housing having an electrically conductive probe depending therefrom is supported by an electrically conductive shaft which is inserted into the ground. A perceptible signal, carried by the housing, which has a source of electrical energy stored therein, is activated as water rises to close a circuit between the probe and the shaft. The depth of insertion of the shaft predetermines the height of water necessary to activate the signal. Extensible means are provided to elevate the signal above crop height.

4 Claims, 4 Drawing Figures

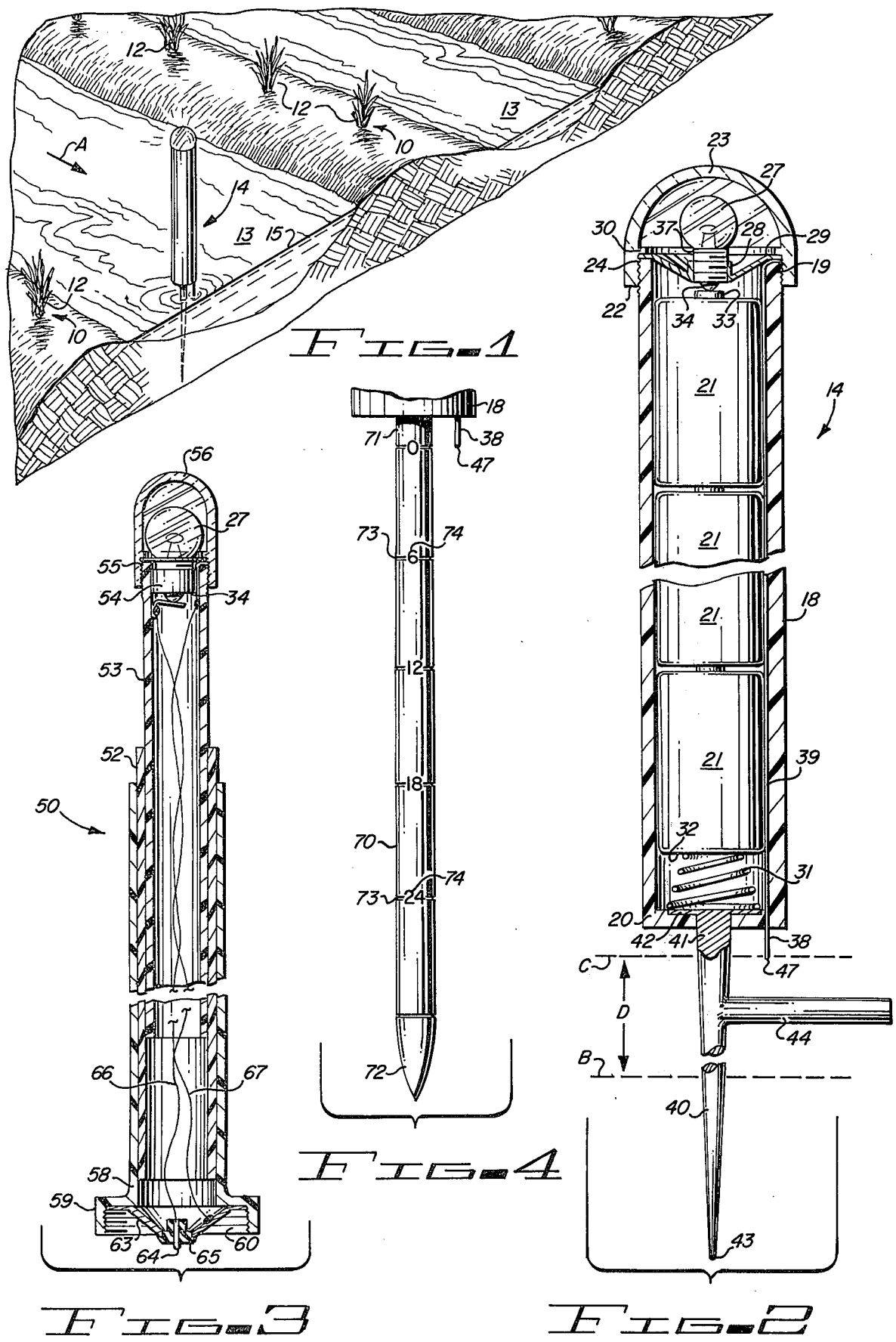

IRRIGATION SIGNAL

This invention relates to signalling devices.

More particularly, the invention relates to devices of the type which emit a signal in response to the rise of water to a predetermined level.

In a further aspect, the instant invention concerns a signalling device for use in connection with the irrigation of cultivated land.

The desirability of an irrigation signalling device is well established. In accordance with conventional practice, irrigated land is prepared with a plurality of parallel furrows extending longitudinally between the crop rows. A primary trench extends transverse of the furrows along one edge of the field, while a secondary trench extends transverse of the furrows at the other end thereof. Irrigation water is introduced into the primary trench from a suitable source, such as a canal, by pump or through flood gates, flows through the furrows into the secondary trench.

The secondary trench is remote from the primary trench and the operator's station for controlling the irrigation. This distance could be several hundred yards. It is therefore necessary for the operator to know when the field has been flooded to the required depth. The inability of the operator to ascertain the proper depth of water at the far end of the field is even more pronounced at night. In addition to the matter of conservation of water, overflooding can have serious consequences, such as crop destruction or violation of local laws.

To assist the operator, various prior art irrigation signalling devices have been proposed. Commonly, the devices are placed remote from the operator, generally in the secondary trench, and emit a warning signal when the predetermined water level has been reached. Alternately, the devices raise a signalling arm or provide an illuminated signal. Each includes a self-contained battery pack which energizes the signal. The devices have proven to be generally unreliable, however, due to the nature of the means for closing the circuit.

A popular concept is float-activated switches. Due to the amount of silt and contaminants in the irrigation water, the floats frequently stick. Similarly, the linkage in float-activated mechanical signalling means can be rendered inoperative. Floats and switches are eliminated in devices which incorporate immersion type batteries. As the irrigation water enters the battery, contaminants are carried therein which eventually renders the battery inoperative. Separate battery packs used in cooperation with certain prior art devices necessitate additional handling and set-up and are easily damaged during transportation.

Accordingly, it is a primary object of the present invention to provide an improved irrigation signalling device which will overcome the deficiencies of the prior art.

Another object of the present invention is the provision of a self-contained irrigation signalling device.

Yet another object of the present invention is to provide an electrically activated signalling device having a self-contained source of electrical energy. Still another object of the present invention is to provide an electrical irrigation signalling device having improved circuit closing means which are not subject to contamination by the irrigation water.

A further object of the present invention is to provide an irrigation signalling device which is readily adjustable to provide an indication in accordance with a predetermined water level.

And a further object of the invention is the provision of an irrigation signalling device having signal emitting means which are readily adjustable to be brought into the operator's view, independent of the depth of water for which it is set.

And yet a further object of the instant invention is the provision of an irrigation signalling device of the above type which is relatively inexpensive to manufacture, unencumbered and not readily susceptible to damage during storage, shipment or use.

Briefly, to achieve the desired objectives of the present invention in accordance with a preferred embodiment thereof, first provided is a housing having a source of electrical energy therein, such as a plurality of conventional flashlight batteries. Electrically activated perceptive signalling means, such as a lightbulb, is carried by the housing and communicates with an electrically conductive probe depending from the housing. Electrically conductive support means depend from the housing and support the probe at a predetermined distance of ground level in accordance with the desired depth of irrigation. As the rising water contacts the probe, the electric circuit is completed with the support and the signal is energized.

In accordance with a preferred embodiment of the instant invention, the support is in the form of an elongate shaft which is inserted into the ground a predetermined distance. Graduations on the shaft indicate the depth from the probe to the ground. The device may further include extensible means, such as a telescoping tubular arrangement, for elevating the signalling device.

The foregoing and further and specific objects and advantages of the present invention will become readily apparent to those skilled in the art from the following detailed description of the preferred embodiment thereof, taken in conjunction with the drawings, in which:

FIG. 1 is a partial perspective view of a typical irrigated field, utilizing the device of the instant invention as a signalling means;

FIG. 2 is a vertical, sectional view of an irrigation signalling device constructed in accordance with the teachings of the present invention;

FIG. 3 is a vertical, sectional view of an extensible attachment detachably securable to the device of FIG. 1, and especially useful for selectively elevating the signalling means associated therewith, and FIG. 4 is an elevational view of an alternate support means for use in connection with the device of FIG. 2.

Turning now to the drawings, in which the same reference characters denote corresponding elements throughout the several views, attention is first directed to FIG. 1, which shows a field prepared in accordance with conventional practice for irrigation. The field includes a plurality of spaced crop rows 10 having furrows 11 therebetween. Although not specifically illustrated herein, it will be readily apparent to those skilled in the art that a transverse primary trench communicates with the furrows 11 at one end, and a transverse secondary trench communicates with furrows 11 at the other end thereof. A crop as represented by plants 12 grows in each crop row. Irrigation water 13 flows from the primary trench throughout the furrows 11 in the direction of the arrow A, for purposes of the instant illustration, to the secondary trench. Signalling device 14 appropriately placed in furrow 11, or the secondary trench, emits a perceptible signal when the surface level 15 of irrigation water 13 reaches a predetermined height, as will be hereinafter described in greater detail.

Signalling device 14, as viewed in FIG. 2, includes an elongate tubular housing 18 having an upper end 19 and a lower end 20 which is sized to enclose a plurality of flashlight batteries 21, arranged in series. Upper end 19 is provided with external an external screw flight 22. Transparent cover 23 carries an internal screw flight 24 which matingly engages external screw flight 22. Although housing 18 and transparent cover 23 are readily fabricated from various materials in accordance with conventional manufacturing techniques, preferred material is plastic, which is at once non-conductive and relatively impervious to corrosion and damage.

Receptive signalling means herein shown as incandescent lamp 27 is carried by socket 28 integrally formed with plate 29. Inwardly directed annular flange 30, carried by cover 23, cooperates with upper end 19, holding the peripheral edge of plate 29 therebetween for securement of lamp 27 to housing 18. The threaded arrangement between housing 18 and cover 23 facilitates access for replacement of lamp 27 and batteries 21. Compression spring 31 bearing against lower end 20 of housing 19, urges upwardly against the negative terminal 32 of lower battery 21, thereby urging positive terminal 33 of upper battery 21 firmly against positive contact 34 of lamp 27.

In accordance with conventional practice, base 37 constitutes the negative or ground terminal for lamp 27. Socket 28 and plate 29 are electrically conductive. An electrically conductive probe 38, depending from the lower end 20 of housing 18, communicates with plate 29 through electric lead 39. As a practical manufacturing expediency, probe 38 and electric lead 39 are integrally formed of a single piece of heavy gauge wire having an upper bent end which is held between plate 29 and upper end 19. To prevent accidental contamination from irrigation water, probe 38 is hermetically sealed within lower end 20. Support means in the form of an electrically conductive shaft 40 depends from lower end 20 and supports housing 18. Shaft 40 terminates at the upper end 41 thereof with an electrically conductive plate 42, against which spring 31 directly bears. Lower end 43 of shaft 40 is tapered or pointed for ease of insertion into furrow 11. Handle 44 affixed to shaft 40 assists in the insertion and removal of the device within the ground.

During operation, shaft 40 is inserted into furrow 11 a predetermined distance as indicated by the dashed line B which represents the ground level. The lower end 47 of probe 38 lies in the plane indicated by dashed line C. Distance D between dashed line and dashed line C indicates the desired depth of irrigation. As water level 15 coincides with the plane indicated by dashed line C, electrical continuity is established between probe 38 and the shaft 40 through the irrigation water, energizing lamp 27. To selectively adjust the height of lamp 27 for convenient operator viewing over obstacles and high crops, an extensible attachment generally designated by the reference character 50 is detachably securable to the upper end 19 of housing 18, and is specifically illustrated in FIG. 3. Tubular members 51, 52 and 53 are sized and arranged to be slideable, one within the other, in telescoping fashion. Slight friction between the members maintains the preselected extended distance without the use of auxiliary locking devices. Lamp 27 is carried within socket 54 at the upper end 55 of tubular member 53. Transparent cover 56 threadedly engages upper end 55 and provides a protective shield for lamp 27. Electrically conductive spring arm 57 is biased upwardly for contact with the positive terminal 34 of lamp 27. Lower end 50 of tubular member 51 includes an enlarged section 59 having an internal screw flight 60 therein detachably securable to screw flight 22 at the upper end 19 of housing 18. Electrically conductive plate 63 is carried within enlarged section 59 and is held firmly in place against the upper end 19 of housing 18 when screw flight 60 is engaged therewith as hereinbefore described.

A central electrode 64 embedded in dialectric material 65 is brought into contact with positive terminal 33 of upper battery 21 when extensible attachment 50 is secured to the upper end 19 of housing in lieu of transparent cover and plate 29. Concurrent therewith, plate 63 is brought into contact with electric lead 39. Electric lead 66 communicates between a central electrode 64 and spring arm 57 within extensible attachment 50. Similarly, electric lead 67 communicates between plate 63 and socket 54. With attachment 50 secured to housing 18, operation of the irrigation signalling device of the instant invention proceeds in accordance with the operation hereinbefore described. Since the device as particularly described in connection with FIG. 2 cannot be elevated for convenience of operator viewing without altering irrigation depth, the attachment of FIG. 3 provides selective elevation of lamp 27 independent of the desired irrigation depth.

FIG. 4 illustrates an alternately preferred support means for the device of the instant invention. Electrically conductive elongate shaft 70 depends at the upper end 71 thereof from housing 18, and has a pointed lower end 72. Graduations in the form of circumferential lines 73 are spaced along shaft 70. Each line 73 has corresponding indicia 74. As herein specifically illustrated, lines 73, which may be annular grooves or other markings, are spaced six inches apart. It is noted that the uppermost line 73, which lies in the plane of the lower end 47 of probe 38, is indicated with the reference numeral 0. In descending order, the lines 73 have corresponding consecutive numerals 6, 12, 18, 24. The specific number indicates the distance between the corresponding line and the lower end 47 of probe 38. Inserting shaft 70 into furrow 11 to a predetermined particular line will provide irrigation depth corresponding to the instant number, prior to activation of lamp 27.

Various changes and modifications in the embodiments herein chosen for the purposes of illustration will readily occur to those skilled in the art. For example, the signalling device has been specifically illustrated as a lamp which emits a visual signal. Other visual signals and audible signals are immediately apparent as appropriate to be energized by the batteries. Similarly, the flashlight batteries shown are convenient and economical. However, other battery configurations and corresponding changes in the size and shape of the housing are anticipated. In any case, experimentation has proven that a device of the character hereinbefore described adequately meets the objectives set forth.

Having fully described and disclosed the present invention and the preferred embodiments therein in such clear and concise terms as to enable those skilled in the art to understand and practice the same, the invention claimed is:

1. An electric signalling device for emitting a perceptible signal when a liquid has risen to a predetermined height above a selected surface, said signalling device comprising:
   a. a housing having a source of electrical energy therein;
   b. electrically activated means for emitting a perceptible signal carried by said housing and having an activation circuit connected to said source of electrical energy;
   c. an electrically conductive probe communicating with said signal emitting means and having the lower end thereof depending from said housing; and
   d. an electrically conductive support depending from said housing for supporting the lower end of said probe at a predetermined distance above said surface, said probe and support forming a part of said circuit and defining a generally horizontal gap therebetween whereby a predetermined increase in liquid level will close said gap and thereby establishing said circuit activating said perceptible signal.

2. The electric signalling device of claim 1, wherein said support includes an elongate shaft having a lower end for inserting into said surface.

3. The electric signalling device of claim 2, further including
   a. a plurality of graduations carried by said shaft and spaced relative the lower end of said probe; and
   b. indicia corresponding to each said graduation to indicate the depth of insertion of said shaft for a corresponding predetermined height of said liquid to activate said perceptible signal.

4. The electric signalling device of claim 1, further including extensible means detachably securable to said housing for selectively elevating said perceptible signal relative the lower end of said probe.

* * * * *